United States Patent [19]

Ohkubo et al.

[11] Patent Number: 5,125,256
[45] Date of Patent: Jun. 30, 1992

[54] METHOD OF MANUFACTURING OUTSIDE RING

[75] Inventors: Kiyoshi Ohkubo, Maebashi; Yujiro Nagayama, Kamakura, both of Japan

[73] Assignee: Nippon Seiko Kabushiki Kaisha, Tokyo, Japan

[21] Appl. No.: 681,343

[22] Filed: Apr. 8, 1991

[30] Foreign Application Priority Data

Apr. 17, 1990 [JP] Japan .................. 2-99305

[51] Int. Cl.⁵ ............. B21D 28/00; B21D 53/88
[52] U.S. Cl. ................................ 72/340; 72/336; 72/342.1; 72/359; 72/354.6; 29/893.34
[58] Field of Search ............. 72/340, 336, 337, 329, 72/330, 342.1, 342.94, 359, 358, 355.4, 354.6; 29/893.33, 893.34

[56] References Cited

U.S. PATENT DOCUMENTS

| 140,920 | 7/1873 | Herzberg | 72/336 |
| 520,194 | 5/1894 | Thomson | 29/893.34 |
| 968,789 | 8/1910 | Olb | 72/336 |
| 1,847,926 | 3/1932 | Chase | 29/893.33 |
| 2,014,605 | 9/1935 | Zimmerman | 72/358 |
| 4,770,283 | 9/1988 | Putz | 72/359 |
| 4,798,077 | 1/1989 | Douglas | 29/893.34 |

FOREIGN PATENT DOCUMENTS 5359  1/1903 Denmark ................ 72/359

Primary Examiner—Daniel C. Crane
Attorney, Agent, or Firm—Shapiro and Shapiro

[57] ABSTRACT

An outside ring manufacturing method comprises a first step of blanking out from a metal sheet a blank with a circular body portion and tongue portions which protrude at several places from the outer peripheral edge of this body portion, a second step of press forming the blank so that the body portion is formed into a tapered cylinder portion which tapers off or decreases in diameter with the distance away from the tongue portions and so that the tongue portions are made parallel to an axis of the tapered cylinder portion, a third step of adjusting the geometry of each part to a predetermined geometry through the machining of an end surface of the tapered cylinder portion and the tongue portions, and a fourth step of heat treatment to achieve a desired hardness.

7 Claims, 8 Drawing Sheets

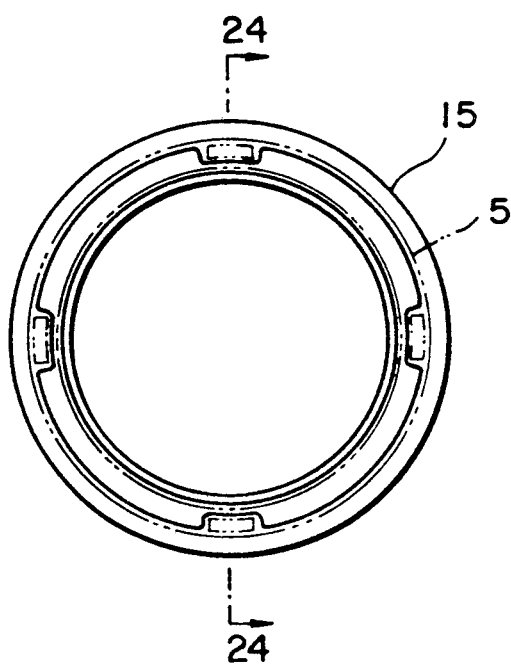 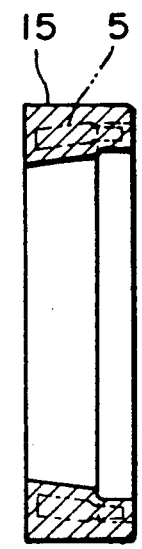
FIG. 23
PRIOR ART
FIG. 24
PRIOR ART

METHOD OF MANUFACTURING OUTSIDE RING

BACKGROUND OF THE INVENTION

1. Field of the Invention

The present invention relates to a method of manufacturing an outside ring and, more particularly, is directed to a method for the manufacture of an outside ring for use in a synchromesh mechanism of a manual transmission for automobiles.

2. Related Background Art

Recent increases in output power of automobile engines have given rise to a need for greater synchromesh capacity of manual transmissions.

To increase the synchromesh capacity, a double cone type synchromesh mechanism instead of a single cone type has been proposed, so as not to increase the operating force of the shift lever.

As shown in FIG. 20, a double cone type synchromesh mechanism has a construction wherein an outer balk ring 4, an outside ring 5, and an inner balk ring 6 are provided between the coupling sleeve 1 and the clutch gear 3 which rotates in synchronism with the transmission gear 2. The coupling sleeve 1, being engaged with the insert spring 12 fitting onto the periphery of the synchronizer hub 8 which rotates with the drive shaft 7, moves axially (left/right direction in FIG. 20) on the basis of an operation of the shift lever.

When the coupling sleeve is pushed to left in FIG. 20 with the shift lever operation, due to the action of the frictional force between the outer balk ring 4 and the outside ring 5 and between the outside ring 5 and the inner balk ring 6, any difference of revolution between the coupling sleeve 1 and the clutch gear 3 is eliminated. Then, a spline 9 on the inner periphery of the coupling sleeve moves so as to bridgingly couple a spline groove 10 formed on the outer periphery of the clutch gear 3 and a spline groove 11 formed on the outer periphery of the insert spring ring 12, whereby the transmission gear 2 rotates in synchronism with the drive shaft 7.

The outside ring 5, in a double cone type synchromesh mechanism constructed and operated as above described has a configuration as in FIGS. 21 and 22.

More particularly, the outside ring 5 comprises a tapered cylinder portion 13 whose diameter changes along its axis and several projections 14 which are formed at regular intervals on the end surface 13a of larger diameter. The thickness t of each projection 14 is smaller than the thickness T of the tapered cylinder portion 13 (T>t), and the projection 14 are bent inwardly with regard to the cylinder portion 13 so as to be parallel to the axis of the cylinder portion 13.

An outside ring 5 of such configuration as described has been produced traditionally by two methods. The first method involves removing the unnecessary portions of a thick walled tubular material in a machining or milling process. The second method involves removing the unnecessary portions of a blank 15, such as shown in FIGS. 23 and 24, which has been forged out of a bar material with a fixed length.

When making an outside ring in accordance with either of the above mentioned traditional methods, production cost is very high.

In case of the first method, the portion to be cut is so large that the yield is very poor and a lot of machining time is required.

The second method requires many forging processes to produce a blank 15 as is shown in FIGS. 23 and 24. Also, since a large portion has to be cut, the yield is poor and substantial machining time is required.

SUMMARY OF THE INVENTION

The outside ring manufacturing method in accordance with the present invention comprises a first step of blanking out from a metal sheet a blank with a circular body portion and several tongue portions protruding from the outer peripheral edge of this body portion, a second step of press working the blank so that a tapered cylinder portion which decreases in diameter with the distance from the tongue portions is made out of the body portion and so that the tongue portions are made parallel to the axis of the tapered cylinder portion, a third step of machining the end surface of the tapered cylinder portion and the tongue portions to achieve a predetermined geometry, and a fourth step of heat treatment in order to gain the required hardness.

By the end of the second step, the several tongue portions above mentioned are bent inwardly with regard to the tapered cylinder portion. The actual process of bending each tongue portion in this way can be carried out either in the first step or in the second step.

In case of the outside ring manufacturing method in accordance with the present invention comprising the steps above described, by making the portion of the material to be cut smaller, the machining time can be made shorter and the yield of the material can be improved.

BRIEF DESCRIPTION OF THE DRAWINGS

FIG. 20 is a partial cross section showing a synchromesh mechanism with an outside ring being set in.

FIG. 23 is a view of a blank used when making outside rings in forging processes.

FIG. 24 is a sectional view taken along the line 24—24 of FIG. 23.

DESCRIPTION OF THE PREFERRED EMBODIMENTS

Figures 1, 2:
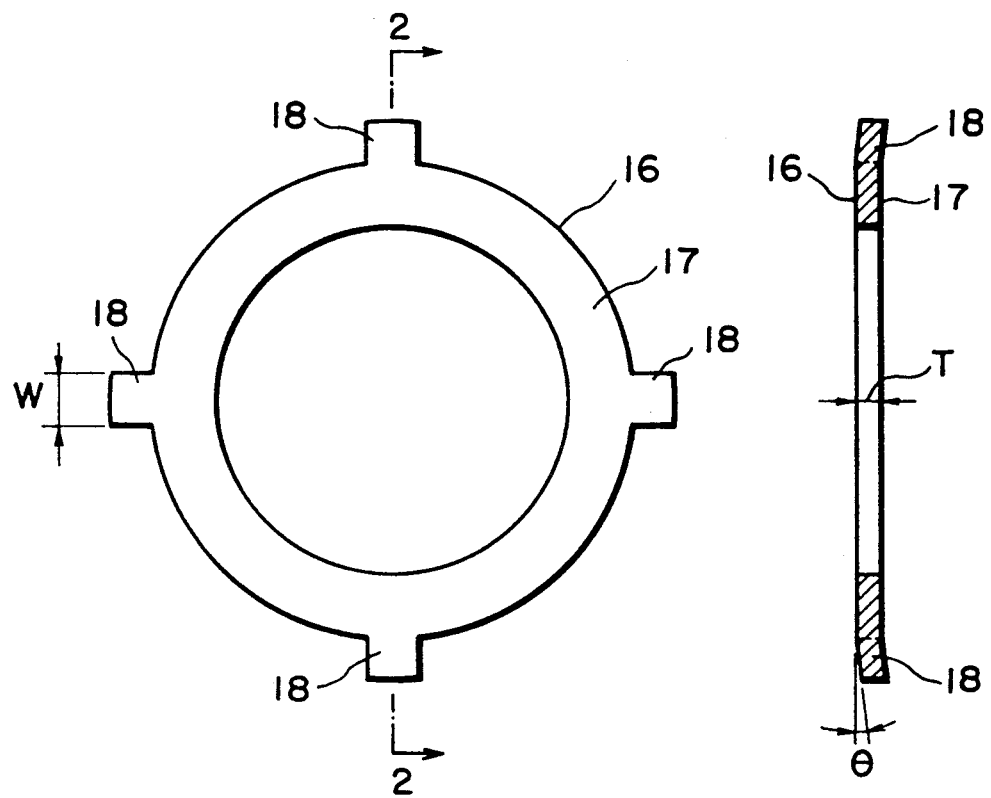
FIG. 1 is a plan view of the material which has been made in the first step.
FIG. 2 is a sectional view taken along the line 2—2 of FIG. 1.

Now the invention will be further described with reference to the embodiments shown in the drawings.

The first embodiment according to the present invention is explained with reference to FIGS. 1 to 13.

When carrying out the outside ring manufacturing method of the present invention, as the first step, a piece as shown in FIGS. 1 and 2 is blanked out from a metal sheet in a blanking process using a not illustrated blanking device.

The blank 16 includes a circular body portion 17 and several tongue portions 18 (4 in case of the embodiment illustrated) which protrude outwardly from the peripheral edge of the body portion 17. Each tongue portion 18 is tilted by an angle $\theta$ with regard to the body portion 17, this inclination $\theta$ coinciding with the inclination $\theta$ of the tapered cylinder portion (FIG. 22), which constitutes the finished outside ring 5.

In addition, when carrying out the blanking process in the first step, by making the blanked surfaces (the inner and outer peripheral edges of the body portion 17 and the peripheral edge of the tongue portions 18) smoother in a fine blanking process for example, the succeeding machining processes will be carried out more easily. Consequently, the profile regularity of the final product can be improved.

Figure 3:
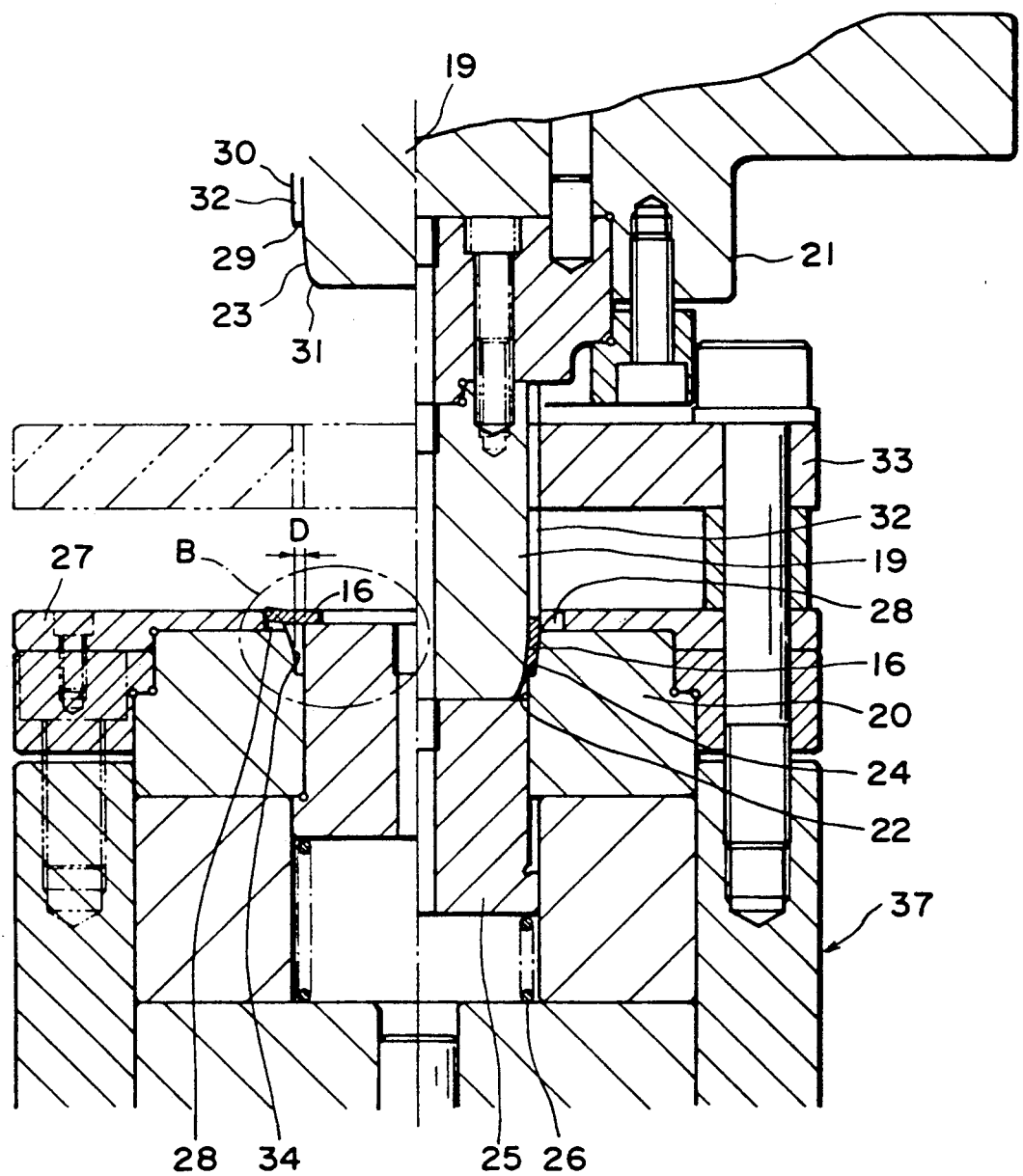
FIG. 3 is a longitudinal section showing a stamping machine used in the second step.
Figure 4:
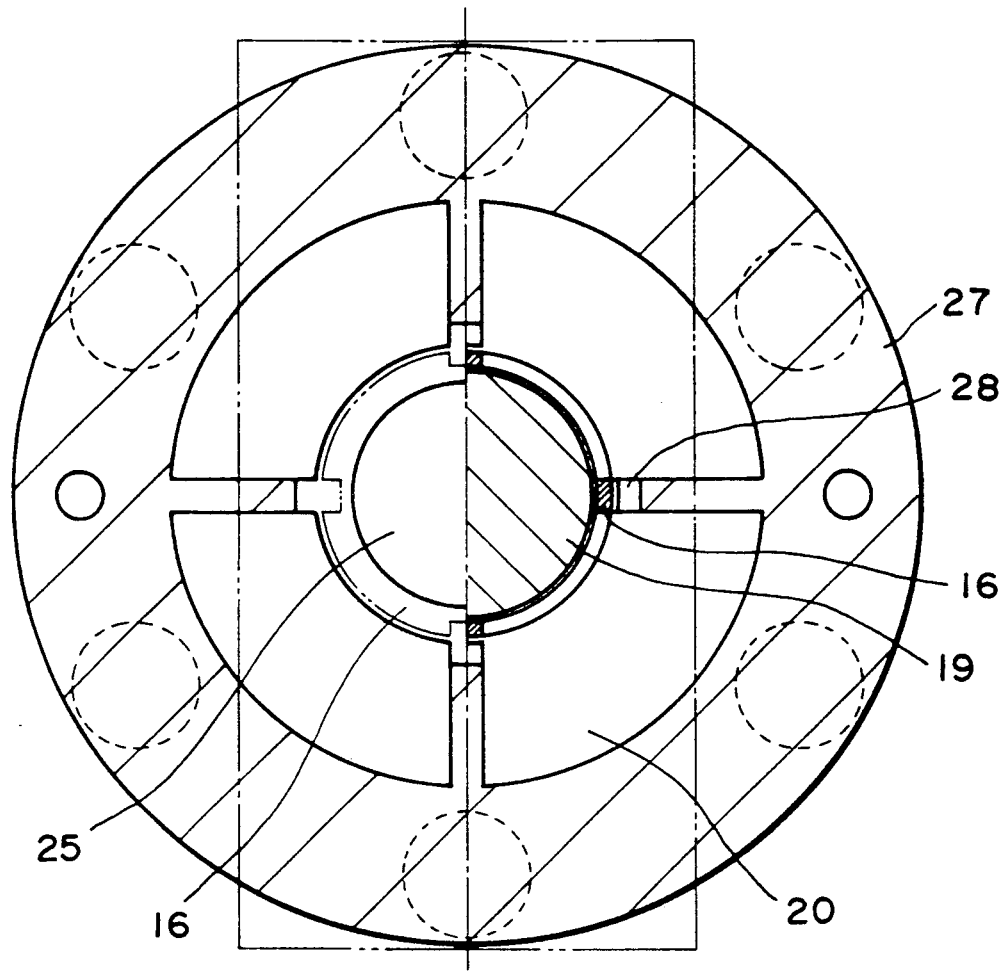
FIG. 4 is a transverse section of the same stamping machine.
Figure 5:
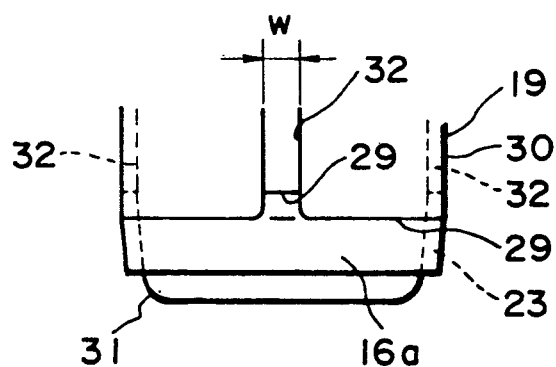
FIG. 5 is a side view of the upper die set in this stamping machine.
Figure 6:
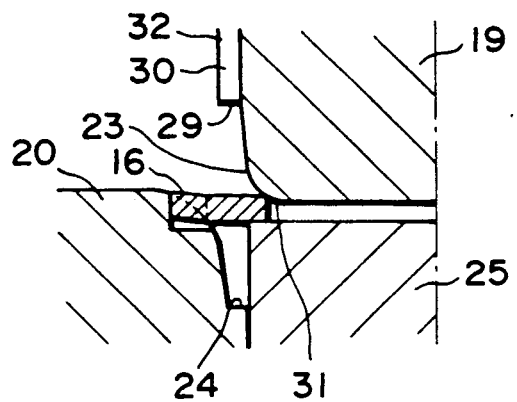
FIGS. 6 to 11 are longitudinal sections of the portion B in FIG. 3, which show the processing conditions of the material in the order of processing in the second step.
Figure 7:
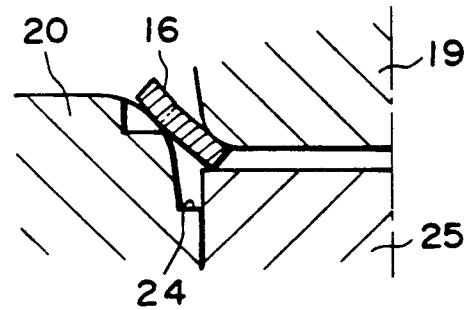
Figure 8:
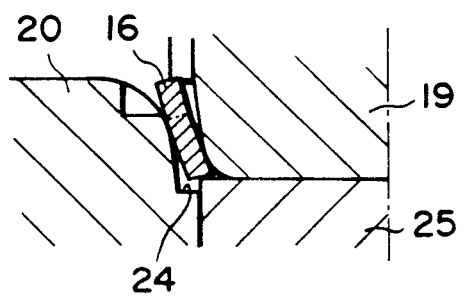
Figure 9:
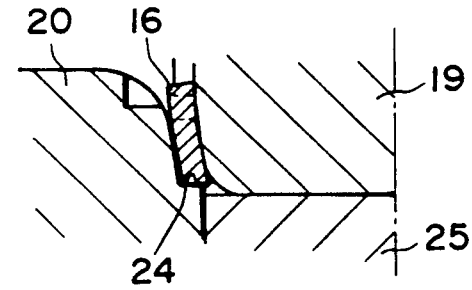

After the blank 16 as shown in FIGS. 1 and 2 is made in the first step above mentioned, it is press formed by a stamping machine shown in FIGS. 3 and 4, and in which an upper die 19 as shown in FIG. 5 is set.

Figure 12:
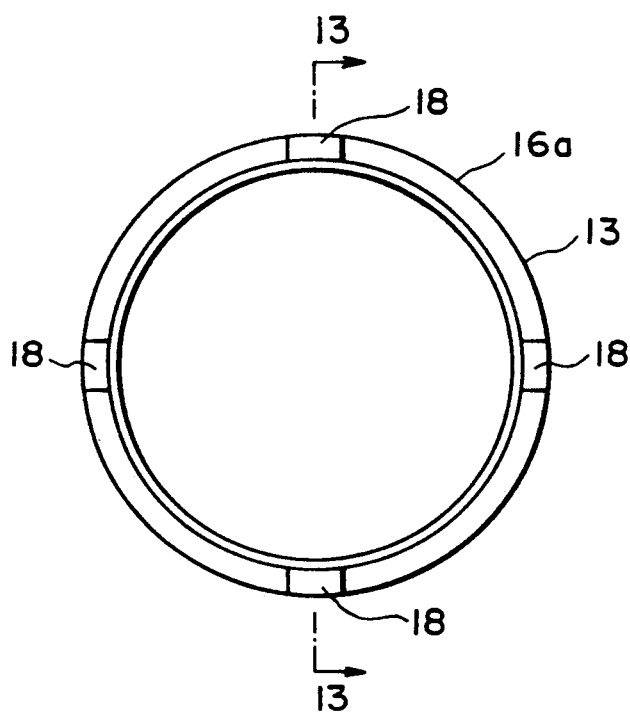
FIG. 12 is a plan view showing the configuration of the material after the completion of the second step.
Figure 13:
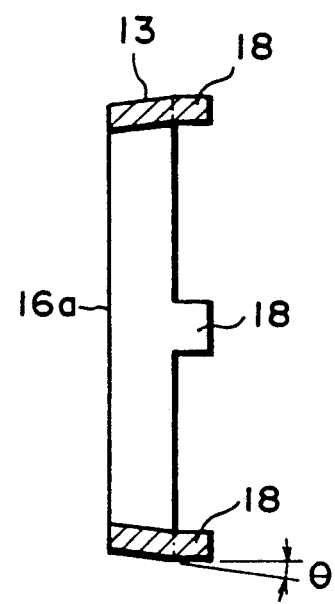
FIG. 13 is a sectional view taken along the line 13—13 of FIG. 12.
Figure 14:
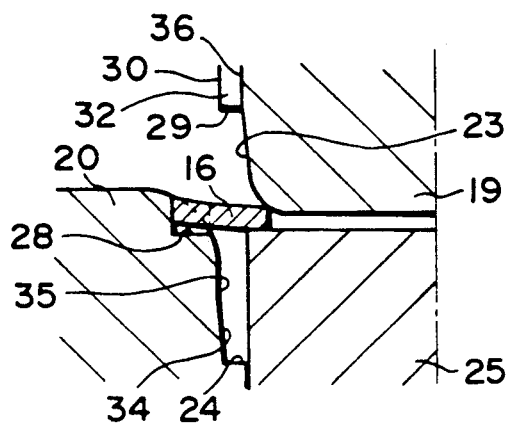
FIGS. 14 to 19 are the similar sectional views to FIGS. 6 to 11, and show the order of processing in the second step using a stamping machine with upper and lower dies of a different arrangement.
Figure 15:
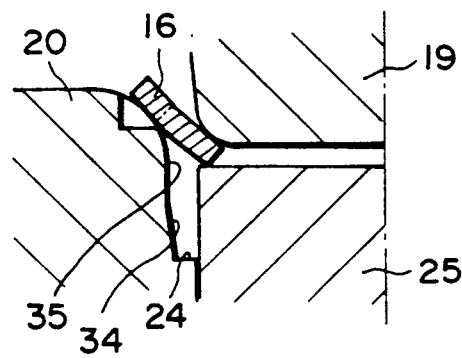
Figure 16:
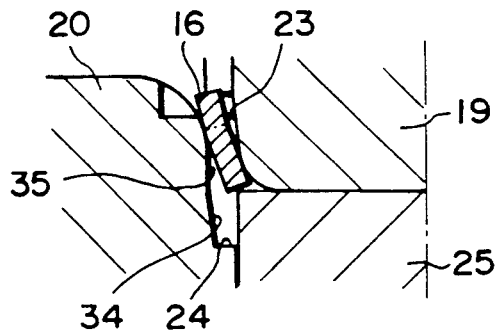
Figure 17:
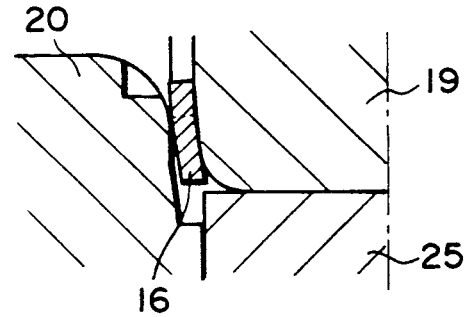
Figure 18:
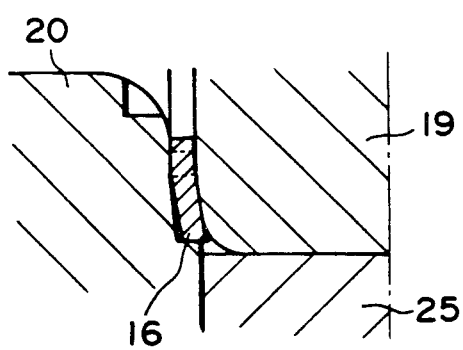
Figure 19:
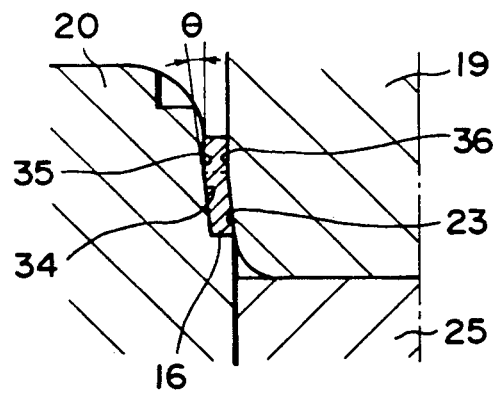
Figure 20:
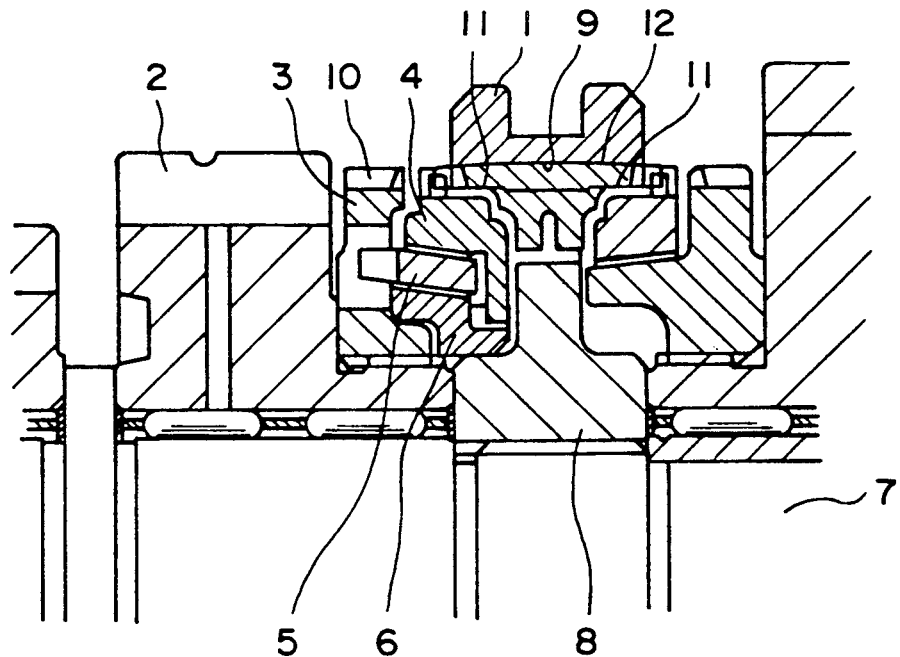

With this stamping machine, by applying pressure on the blank 16 between a circular lower die 20 fixed to the machine body 37 and the upper die 19 fixed to the lower surface of a ram 21, the blank 16 which has a relatively flat form is processed into a piece 16a which has a form as illustrated in FIGS. 12 and 13.

The lower die 20 is constituted so as to provide a bore 22 in its center and a tapered portion 34 at the upper end opening of this bore 22, which is formed so as to match the inclination $\theta$ of the tapered cylinder portion 13 (see FIGS. 13 and 22) of a finished outside ring.

The width D of a step portion 24 formed between the lower end of the tapered portion 34 and the upper end of the bore 22 must be a little bit smaller than the thickness T (FIG. 2) of the metal sheet of the blank 16 (D<T), so that a part of the end edge of the tapered cylinder portion 13 on the side with the smaller diameter can project inwardly from the step portion 24.

An extrusion piston 25 is vertically movably mounted inside the bore 22 of the lower die 20, and by means of a compression spring 26, an upward directed resilient force is applied to extrusion piston 25.

Also, on the upper surface of the lower die 20, a locating plate 27 is fixed. Locating recesses 28 are provided at four places on the inner peripheral edge of this locating plate 27 for engagement with the tongue portions 18 formed at four places on the outer peripheral edge of the blank 16, so that the blank 16 can be securely placed in a fixed position or the upper surface of the lower die 20.

The lower end of the upper die 19 fixed to the lower surface of the ram 21, which moves up and down by means of a not illustrated hydraulic mechanism, comprises, as shown in FIGS. 3 and 5, a tapered portion 23 along the outer periphery of the lower end, and a cylinder portion 30 above this tapered portion 23, and connected therewith via a step 29, having a larger diameter than the upper end of the tapered portion 23. Also, the lower end of the tapered portion 23 is connected with the lower surface of the upper die 19 smoothly via an arcuate surface 31.

The outer surface of the cylinder portion 30 of the upper die is provided with reentrant grooves 32 at four places, each groove having a rectangular cross section and extending axially. The lower end of each reentrant groove 32 is open toward the step 29, and the both edges of this opening are chamfered to be a quarter circle. The width of each groove w must be slightly smaller than the width W (FIG. 1) of the tongue portions 18 formed on the outer peripheral edge of the material 16 (w<W), so that the both side edges of each tongue portion 18 may be squeezed by the inner side surfaces of the corresponding groove 32. The width W of the tongue portions 18 may thus be controlled to a predetermined value (the width w of each groove 18), as the press forming process in the second step proceeds and each tongue portion 18 enters each groove 32.

The processing of the material 16 in FIGS. 1 and 2 into a configuration as is shown in FIGS. 12 and 13 using a stamping machine constructed as described above, is carried out as follows:

First, as indicated in the left half of FIGS. 3 and 4, the ram 21 is lifted up to displace the upper die 19 sufficiently upward, and in this condition, the blank 16 is placed in the fixed position of the upper surface of the lower die 20.

Next, the upper die 19 is lowered to the position shown in the right half of FIGS. 3 and 4, so that the material 16 is clasped tightly between the upper die 19 and the lower die 20 to undergo a plastic deformation into the form of piece 16a as illustrated in FIGS. 12 and 13.

Figure 10:
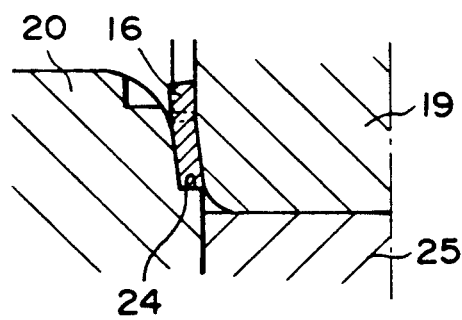
Figure 11:
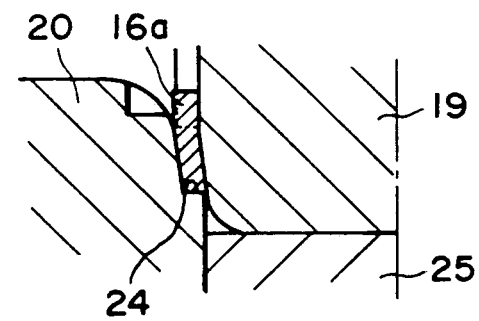

More particularly, when the upper die 19 is lowered from the position shown in the left half of FIGS. 3 and 4 to the position shown in the right half of the same drawings after the material 16 has been set in the fixed position of the upper surface of the lower die 20, the material 16 undergoes a deformation progressing in the order of FIG. 6, FIG. 7, FIG. 8, FIG. 9, and then FIG. 10, finally assuming the configuration shown in FIG. 11 and corresponding to FIGS. 12 and 13.

In the foregoing process, the body portion 17 (FIGS. 1 and 2), being clasped between the tapered portion 23 of the outer surface of the upper die 19 and the tapered portion 34 of the inner surface of the lower die 20, undergoes a plastic deformation to become the tapered cylinder portion 13, which decreases in diameter with the distance away from the tongue portions 18 and which has parallel opposite axial end surfaces constituted from the peripheral edges of the body portion and perpendicular to the axis of the cylindrical portion thus formed, as shown. The tongue portions 18 also assume an orientation parallel to the axis of the tapered cylinder portion 13.

When the stamping processes are over and the blank 16 has been processed from the configuration in FIGS. 1 and 2 into the configuration shown in FIGS. 12 and 13, the upper die 19 is lifted up by the ram 21.

As the upper die 19 is lifted up, the extrusion piston 25 provided inside the lower die 20 moves upward due to the resilience of compression spring 26. This causes the outer peripheral edge of the upper end of extrusion piston 25 to push up the inner peripheral edge of the lower end of the tapered cylinder portion 13.

As a result, the processed piece 16a is pushed out of the lower die 20. If the processed piece 16a is lifted up together with the upper die 19, it is stripped off by a stripper plate 33 provided over the lower die 20 and having a part inserted into a groove 32 of the upper die 19.

Next, in the third step, the piece 16a, which has been produced as described above, undergoes a machining process such as a cutting process.

Figures 21, 22:
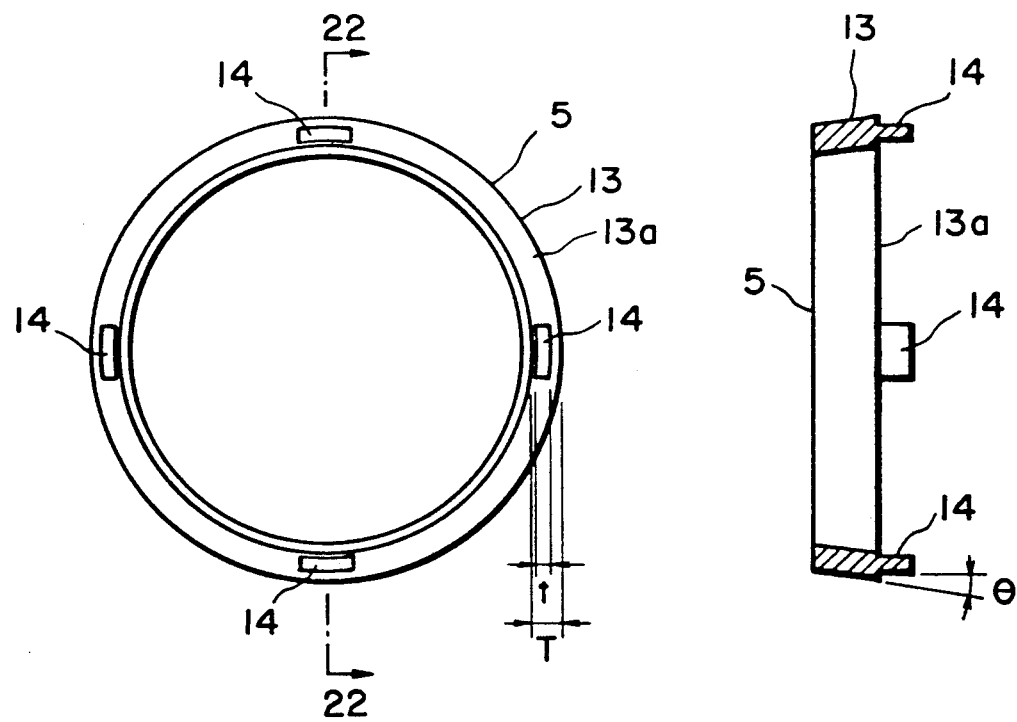
FIG. 21 is a view of the outside ring in FIG. 20 seen from the left side.
FIG. 22 is a sectional view taken along the line 22—22 of FIG. 21.

This process may include machining both the upper and lower ends of the tapered cylinder portion 13 and the tongue portions 18 to a predetermined geometry, performing a surface finish on selected surfaces (the end surface of the tapered cylinder portion 13 with the smaller diameter and the end surfaces of the tongue portions 18), and chamfering selected corners. Also in this third step, each tongue portion 18 is made thinner to form the projections 14 (FIGS. 21 and 22). In this condition, the geometry of the piece 16a conforms with that of the outside ring 5 shown in FIGS. 21 and 22.

Finally in the fourth step, heat treatment is carried out to achieve a desired hardness, and the outside ring is completed.

The action of the outside ring manufactured in accordance with the method of the present invention comprising the steps above described is in itself same as the action of those produced by a traditional method.

With the method of the present invention, however, by minimizing the cutting of materials, it is possible to shorten the processing time and to improve the yield of material.

FIGS. 14 to 19 show a modified die arrangement whereby the inclination θ of each tongue portion 18 may be controlled more precisely and the designs of upper and lower dies can be simplified.

In this modified arrangement, a cylindrical surface 35 with a constant diameter is formed above the tapered portion 34 of the inner surface of the lower die 20 and coacts with back surfaces 36 of reentrant grooves 32 to clasp the tongue portions 14.

As a result, in the final stage of the press forming process, the action whereby the tongue portions 18 are clasped tightly between the cylindrical surface 35 and the reentrant grooves 32 and made parallel to the axis of the tapered cylinder portion 13 can be carried out securely.

Additionally, because each tongue portion 18 is tightly clasped between the cylindrical surface 35 and the back surface 36 of the corresponding groove 32, the tongue portions 18 need not be bent relative to the body portion 17 (FIGS. 1 and 2) in the first step.

Also with this arrangement of dies 19, 20, it is not necessary to carry out the process of forming the circular flat body portion 17 into the tapered cylinder portion 13 and the process of squeezing the tongue portions 18 at the same time. Consequently, dies can be designed on the assumption that the deformation of the body portion 17 into the tapered cylinder portion 13 and the squeezing of the tongue portions 18 are independent processes, resulting in a higher degree of freedom in designing dies 19, 20.

As will be appreciated from the preceding description, by the outside ring manufacturing method of the present invention, it is possible to produce outside rings more simply and efficiently and at lower cost than has been possible with conventional methods.

What is claimed is:

1. A method of manufacturing an outside ring, such as for a synchromesh transmission, comprising a first step of blanking out from a metal sheet a blank having an annular body portion with inner and outer peripheral edges and tongue portions which protrude at several places from said outer peripheral edge of the body portion, the inner and outer peripheral edges of the body portion defining the thickness of the body portion thereat, a second step of press working said blank to deform said body portion into a tapered cylinder portion with opposite axial end surfaces constituted from said peripheral edges and which decreases in diameter with the distance away from said tongue portions, and at substantially the same time to make said tongue portions parallel to an axis of said cylinder portion, a third step of machining an end surface of said tapered cylinder portion and said tongue portions to achieve a piece of predetermined geometry, and a fourth step of heat-treating the piece in order to achieve a desired hardness.

2. A method of manufacturing an outside ring according to claim 1, wherein in a latter half of said second step, dimensions of said tongue portion are adjusted to desired values by squeezing of the tongue portions in a press die.

3. A method of manufacturing an outside ring according to claim 1, wherein said tongue portions are squeezed within corresponding grooves of a press die during said second step.

4. A method of manufacturing an outside ring, such as for a synchromesh transmission, comprising a first step of blanking out from a metal sheet a blank having an annular body portion with inner and outer peripheral edges and tongue portions which protrude at several places from said outer peripheral edge of the body portion, the inner and outer peripheral edges of the body portion defining the thickness of the body portion thereat, a second step of press working said blank to deform said body portion into a tapered cylinder portion which decreases in diameter with the distance away from said tongue portions, and to substantially simultaneously form said peripheral edges into parallel opposite axial end surfaces of said cylinder portion which are perpendicular to an axis of said cylinder portion, a third step of machining of an end surface of said tapered cylinder portion and said tongue portions to achieve a piece of predetermined geometry, and a fourth step of heat-treating the piece in order to achieve a desired hardness.

5. A method of manufacturing an outside ring, such as for a synchromesh transmission, comprising a first step of blanking out from a metal sheet a blank having an annular body portion with inner and outer peripheral edges and tongue portions which protrude at several places from said outer peripheral edge of the body portion, the inner and outer peripheral edges of the body portion defining the thickness of the body portion thereat, a second step of press working said blank to deform said body portion into a tapered cylinder portion which has parallel opposite axial end surfaces perpendicular to an axis of said cylinder portion and constituted from said peripheral edges and which decreases in diameter with the distance away from said tongue portions, while at substantially the same time to make said tongue portions parallel to an axis of said cylinder portion, a third step of machining an end surface of said tapered cylinder portion and said tongue portions to achieve a piece of predetermined geometry, and a fourth step of heat-treating the piece in order to achieve a desired hardness.

6. A method of manufacturing an outside ring according to claim 5, wherein in a latter half of said second step, dimensions of said tongue portions are adjusted to desired values by squeezing of the tongue portions in a press die.

7. A method of manufacturing an outside ring according to claim 5, wherein said tongue portions are squeezed within corresponding grooves of a press die during said second step.

* * * * *